(12) United States Patent
Kim et al.

(10) Patent No.: US 9,731,465 B2
(45) Date of Patent: Aug. 15, 2017

(54) MOLD BASE FOR CURING PARTS FOR GOLF BALL APPLICATIONS

(71) Applicant: Taylor Made Golf Company, Inc., Carlsbad, CA (US)

(72) Inventors: Hyun J. Kim, Carlsbad, CA (US); Hong G. Jeon, Carlsbad, CA (US); Jaerim Kim, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 774 days.

(21) Appl. No.: 13/791,724

(22) Filed: Mar. 8, 2013

(65) Prior Publication Data

US 2014/0183786 A1 Jul. 3, 2014

Related U.S. Application Data

(60) Provisional application No. 61/746,553, filed on Dec. 27, 2012.

(51) Int. Cl.
*B29C 33/02* (2006.01)
*B29D 99/00* (2010.01)
*A63B 37/00* (2006.01)
*A63B 45/00* (2006.01)

(52) U.S. Cl.
CPC ...... *B29D 99/0042* (2013.01); *A63B 37/0075* (2013.01); *A63B 37/0076* (2013.01); *A63B 45/00* (2013.01)

(58) Field of Classification Search
CPC ...... B29C 33/02; B29C 33/04; B29D 99/0042
See application file for complete search history.

(56) References Cited

U.S. PATENT DOCUMENTS

| 3,264,272 | A | | 8/1966 | Rees |
| 3,492,245 | A | | 1/1970 | Calderon et al. |
| 3,534,965 | A | * | 10/1970 | Broughton ......... B29D 99/0042 273/DIG. 10 |
| 3,804,803 | A | | 4/1974 | Streck et al. |
| 5,827,548 | A | * | 10/1998 | Lavallee ........... B29C 45/14073 264/275 |
| 5,837,183 | A | | 11/1998 | Inoue et al. |
| 6,100,321 | A | | 8/2000 | Chen |
| 6,329,458 | B1 | | 12/2001 | Takesue et al. |
| 6,562,906 | B2 | | 5/2003 | Chen |
| 6,616,552 | B2 | | 9/2003 | Takesue et al. |

(Continued)

OTHER PUBLICATIONS

U.S. Appl. No. 61/746,539, filed Dec. 27, 2012.
U.S. Appl. No. 61/746,540, filed Dec. 27, 2012.

*Primary Examiner* — James Sanders
(74) *Attorney, Agent, or Firm* — Klarquist Sparkman, LLP

(57) ABSTRACT

A method of forming a golf ball construct includes positioning one or more core or mantle portions of a golf ball into respective cavities of a mold system so that the core or mantle portion is substantially centered relative to the respective cavity, delivering injection material into the respective cavities, the injection material being at a first temperature and comprising one or more crosslinking resins, heating the injection material within the respective cavities to a second temperature to crosslink the one or more crosslinking resins, and removing from respective mold cavities the one or more golf ball constructs that are formed by heating the injection material to the second temperature.

11 Claims, 5 Drawing Sheets

(56) References Cited

U.S. PATENT DOCUMENTS

| | | |
|---|---|---|
| 6,924,337 B2 | 8/2005 | Kim et al. |
| 6,930,150 B2 | 8/2005 | Kim |
| 6,939,924 B2 | 9/2005 | Kim et al. |
| 7,037,985 B2 | 5/2006 | Kim et al. |
| 7,528,196 B2 | 5/2009 | Kim et al. |
| 7,879,968 B2 | 2/2011 | Kim et al. |
| 2003/0158312 A1 | 8/2003 | Chen |
| 2005/0070377 A1* | 3/2005 | Cavallaro ........ A63B 37/0003 473/354 |
| 2006/0166762 A1 | 7/2006 | Kim et al. |
| 2010/0160079 A1 | 6/2010 | Kim et al. |
| 2011/0152010 A1 | 6/2011 | Kim et al. |

\* cited by examiner

MOLD BASE FOR CURING PARTS FOR GOLF BALL APPLICATIONS

CROSS REFERENCE TO RELATED APPLICATION

This application claims the benefit of U.S. Provisional Application No. 61/746,553, which was filed on Dec. 27, 2012 and is incorporated herein by reference in its entirety.

FIELD

This disclosure concerns golf balls, and more particularly, methods and apparatus for applying one or more polymers to a golf ball construct.

BACKGROUND

Some golf balls comprise a core and an outer cover comprising a polymer layer. A polymer layer of a golf ball can be applied using an injection molding process. In such a process, a golf ball core is typically retained by core pins within a mold cavity, and polymer is injected into an open volume between walls of the cavity and the golf ball core, thereby forming the polymer layer. In some systems, the outer polymer layer is cured or crosslinked to provide greater structural integrity. Conventional post-injection curing or crosslinking, however, undesirably requires that the molded articles be transferred from the original mold system to a different location for curing and/or crosslinking. Improved systems and methods of forming golf balls that reduce or eliminate the need for a remote curing or crosslinking step are desirable.

SUMMARY

Golf balls and systems for applying one or more polymer layers to a golf ball construct are disclosed.

Disclosed mold systems can comprise a single cavity or a plurality of cavities. A plurality of cavities can increase throughput. Some systems have an even number of cavities, and some provide symmetry among the cavities, thereby improving flow balance among them.

In one embodiment, a method of forming a golf ball construct is provided. The method includes positioning one or more core or mantle portions of a golf ball into respective cavities of a mold system so that the core or mantle portion is substantially centered relative to the respective cavity, delivering injection material into the respective cavities, the injection material being at a first temperature and comprising one or more crosslinkable resins, heating the injection material within the respective cavities to a second temperature to crosslink the one or more crosslinkable resins, and removing from respective mold cavities the one or more golf ball constructs that are formed by heating the injection material to the second temperature.

In some embodiments, the act of heating the injection material comprises activating one or more heating devices positioned adjacent to respective cavities of the mold system. The heating devices can comprise heating elements of an electric heater and/or heating elements of an induction heating member. The one or more heating devices can include a plurality of heating elements positioned in a heater block located adjacent to respective cavities of the mold system.

In some embodiments, the second temperature is at least 50 degrees Celsius higher than the first temperature, at least 100 degrees Celsius higher than the first temperature, at least 150 degrees Celsius higher than the first temperature, at least 200 degrees Celsius higher than the first temperature, or at least 300 degrees Celsius higher than the first temperature. In some embodiments, the second temperature is between 50 and 350 degrees Celsius higher than the first temperature and/or between 150 and 350 degrees Celsius higher than the first temperature.

In some embodiments, the first temperature is less than 70 degrees Celsius and the second temperature is greater than 70 degrees Celsius, the first temperature is less than 70 degrees Celsius and the second temperature is between 70 and 300 degrees Celsius, the first temperature is less than 70 degrees Celsius and the second temperature is between 100 and 250 degrees Celsius, the first temperature is less than 70 degrees Celsius and the second temperature is between 130 and 230 degrees Celsius, or the first temperature is less than 70 degrees Celsius and the second temperature is between 150 and 210 degrees Celsius.

In other embodiments, the act of heating the injection material to the second temperature comprises heating the injection material for less than 15 minutes, between 30 seconds and 15 minutes, and/or between 5 minutes and 10 minutes.

In some embodiments, the act of heating the injection material within the respective cavities to a second temperature comprises rapidly heating the material from the first temperature to the second temperature. The rapid heating to the second temperature can be achieved within five minutes, two minutes, one minute, or within thirty seconds. In some cases, the injection material can be allowed to solidify within the respective cavities before heating the injection material to the second temperature.

The act of delivering injection material into the respective cavities can include opening one or more valve gates positioned adjacent the respective cavities to cause viscous polymer to flow through the one or more valve gates, conveying the viscous polymer into a first short runner and into one or more first radial runners that at least partially surround a circumference of the respective cavities, the first short runner being positioned between the first cavity and the valve gate, and conveying the viscous polymer from the one or more first radial runners into one or more first radial gates and into a volume defined between the core or mantle portion and the mold so as to form a substantially uniformly distributed first polymer layer.

Respective radial runners associated with respective cavities can comprise a single runner system that substantially surrounds the respective cavity, with the first short runner being substantially perpendicular to the radial runner at the area of intersection between the radial runner and the first short runner. The distance between respective valve gates and the intersection of respective first short runners with respective radial runners can be less than 0.5 inches.

In other embodiments, an injection mold for manufacturing golf balls is provided. The mold can include at least one substantially spherical cavity region, at least one heat transfer channels configured to receive a cooling liquid and positioned adjacent respective ones of the spherical cavity regions, and at least one heating device positioned adjacent respective ones of the spherical cavity regions. The heating device can be configured to raise the temperature of a surface of respective spherical cavity regions to a temperature greater than 70 degrees Celsius.

In some embodiments, the heating device can be configured to raise the temperature of the surfaces of respective spherical cavity regions to a temperature between 70 and 350 degrees Celsius, between 100 and 250 degrees Celsius, between 130 and 230 degrees Celsius, and/or between 150 and 210 degrees Celsius.

In some embodiments, the heating device is configured to rapidly increase the temperature of the surfaces of respective spherical cavity regions to a desired crosslinking temperature. The rapid increase in temperature can be achieved within five minutes, two minutes, one minute, or thirty seconds.

In some embodiments, the one or more heating devices comprise heating elements of electric heaters, heating elements of induction heating members, and/or any combination of the two.

In some embodiments, the mold can include a first radial runner and gate system that at least partially surrounds a circumference of the respective spherical cavity regions and a first short runner extending from a first valve gate to the first radial runner and gate system of respective spherical cavity regions. The first short runner can have a length of less than 0.5 inches defined by a distance between the first valve gate and the first radial runner and gate system of respective cavity regions. Such short runner systems can help reduce waste of parts after curing and/or crosslinking.

The respective first radial runners and gate systems can include first radial runners that extend substantially around the circumference of the respective spherical cavity regions, and one or more respective first radial gates connect the respective first radial runners with the respective spherical cavity regions.

Some disclosed systems can be used to mold a mantle or other internal layer of a golf ball. Some mantle layers comprise an elastomeric polymer. Liquid polymer can be injected into the spherical cavity and allowed to solidify. Afterward, the core/polymer assembly part can be removed from the mold. The core pins can assist ejecting the part by hand, by a robot, and/or by gravity.

A variety of polymers can be used. In particular, polymers in the polyurethane, polyalkenamer, polyamide, and ionomer families, as well as blends incorporating polymers from said families, are well suited to golf ball related embodiments. As used herein, "ionomer" refers to ionomeric polymers, copolymers and blends that incorporate an ionomeric polymer component.

Methods of forming one or more golf ball constructs are disclosed. For example, a liquid polymer can be injected into a mold defining a cavity. A core portion of a golf ball can be substantially centered relative to the cavity. A plurality of spaced-apart radial gates can be circumferentially positioned relative to the cavity. The liquid polymer can be conveyed into the cavity and through the plurality of radial gates, and into a volume defined between the core portion and the mold. The conveyed liquid polymer can form a substantially uniformly distributed polymer layer. The polymer layer can be allowed to solidify. A golf ball construct having been so formed can be removed from the mold cavity.

Golf balls are also disclosed. The cover substantially uniformly surrounds a core, and can be formed by a disclosed method. For example, such a method can comprise melting a thermoplastic resin and conveying the thermoplastic resin through a plurality of radial gates into a cavity so as to form the outer cover. The outer cover can be cooled, and the ball can be removed from the cavity.

Mold inserts are also disclosed. For example, this disclosure describes at least one of a plurality of operatively arrangeable injection-mold inserts, each of the plurality of inserts being configured to operatively engage at least one other of the plurality of injection mold inserts. When operatively arranged, the plurality of inserts defines a substantially spherical cavity for injection molding a layer of a golf ball construct. One of the plurality of injection mold inserts can comprise a recessed cavity region defining at least a portion of the substantially spherical cavity. The insert can also comprise a mating surface configured to matingly engage a corresponding mating surface of another of the injection mold inserts in the plurality. A radial gate surface can be recessed from the mating surface.

Also disclosed herein are methods of forming a golf ball construct comprising simultaneously crosslinking at least two polymer layers of the golf ball construct.

The foregoing and other features and advantages will become more apparent from the following detailed description, which proceeds with reference to the accompanying figures.

DETAILED DESCRIPTION

Figure 1:
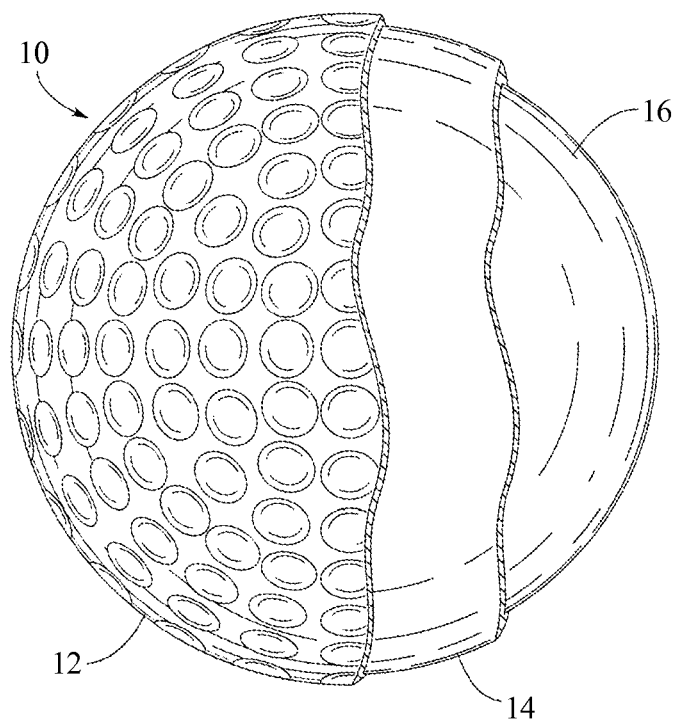
FIG. 1 shows a side elevation view of a golf ball having layers partially removed to reveal interior features.

Various embodiments of sampling systems and their methods of use are disclosed herein. The following description is exemplary in nature and is not intended to limit the scope, applicability, or configuration of the invention in any way. Various changes to the described embodiment may be made in the function and arrangement of the elements described herein without departing from the scope of the invention.

Definitions

As used herein, the singular forms "a," "an," and "the" include the corresponding plural forms unless the context clearly dictates otherwise. Additionally, the term "includes" means "comprises." Further, the term "coupled" encompasses any of various ways in which one thing is linked, mounted, or attached to, and does not exclude the presence of intermediate elements between the coupled things.

Certain terms may be used such as "up," "down,", "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, "pole" means a region of a hemisphere furthest from a corresponding equator. For example, a recessed hemispherical mold cavity defines a pole in a region furthest from a parting line of the mold. A golf ball defines opposed poles in opposed regions furthest from and separated by a selected major circumference encircling the ball.

As used herein, the term "short runner" system means any runner system that extends between a valve gate adjacent a mold cavity to that mold cavity, either directly or via another runner system (such as a radial runner and gate system).

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

As used herein, the term "core" is intended to mean the elastic center of a golf ball. The core may have one or more "core layers" of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term "outer cover layer" as used herein is used interchangeably with the term "cover layer."

The term "intermediate layer" may be used interchangeably herein with the terms "mantle layer" or "inner cover layer" and is intended to mean any layer(s) in a golf ball disposed between the core and the outer cover layer. Should a ball have more than one intermediate layer, these may be distinguished as "inner intermediate" or "inner mantle" layers which are used interchangeably to refer to the intermediate layer nearer the core and further from the outer cover, as opposed to the "outer intermediate" or "outer mantle layer" which are also used interchangeably to refer to the intermediate layer further from the core and closer to the outer cover.

The term "prepolymer" as used herein is intended to mean any material that can be further processed to form a final polymer material of a manufactured golf ball, such as, by way of example and not limitation, a polymerized or partially polymerized material that can undergo additional processing, such as crosslinking.

A "thermoplastic" as used herein is intended to mean a material that is capable of softening or melting when heated and of hardening again when cooled. Thermoplastic polymer chains often are not cross-linked or are lightly cross-linked using a chain extender, but the term "thermoplastic" as used herein may refer to materials that initially act as thermoplastics, such as during an initial extrusion process or injection molding process, but which also may be cross-linked, such as during a compression molding step to form a final structure.

A "thermoset" as used herein is intended to mean a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules cross-link with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a diisocyanate with a polyol, and optionally addition of a chain extender.

The term "thermoplastic polyurea" as used herein is intended to mean a material prepared by reaction of a diisocyanate with a polyamine, with optionally addition of a chain extender.

The term "thermoset polyurethane" as used herein is intended to mean a material prepared by reaction of a diisocyanate with a polyol, and a curing agent.

The term "thermoset polyurea" as used herein is intended to mean a material prepared by reaction of a diisocyanate with a polyamine, and a curing agent.

A "urethane prepolymer" as used herein is intended to mean the reaction product of diisocyanate and a polyol.

A "urea prepolymer" as used herein is intended to mean the reaction product of a diisocyanate and a polyamine.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymers molecular weight distribution curve, i.e., the molecular weight distribution curve for the total polymer product shows only a single maximum.

Mold Systems and Methods of Using the Same

With reference to FIG. 1, a golf ball 10 typically includes an outer cover 12 and one or more internal layers 14, 16. The outer cover 12 can comprise a polymeric layer. At least one mantle layer 14 can lie beneath the cover 12, and above one or more other layers forming a portion of the core 16 of the ball. Alternatively, a golf ball 10 can comprise an outer cover 12 comprising a polymeric layer and a unitary core 16 (e.g., without any intermediate mantle layer). The disclosed systems are suitable for forming the outer cover 12, the mantle layer 14, and other polymer layers of golf balls.

A variety of polymers (or other injection materials) are suitable for use with disclosed molds and methods for forming injection molded outer covers and/or mantle layers 16. In some circumstances, it is advantageous to have formulations that can be cured as a thermoset but only within a specified temperature range which is above that of the typical injection molding process. This allows parts, such as golf ball cover layers, to be initially injection molded and subsequently processed at higher temperatures and pressures to induce further crosslinking and curing, resulting in thermoset properties in the final part.

Figure 2:
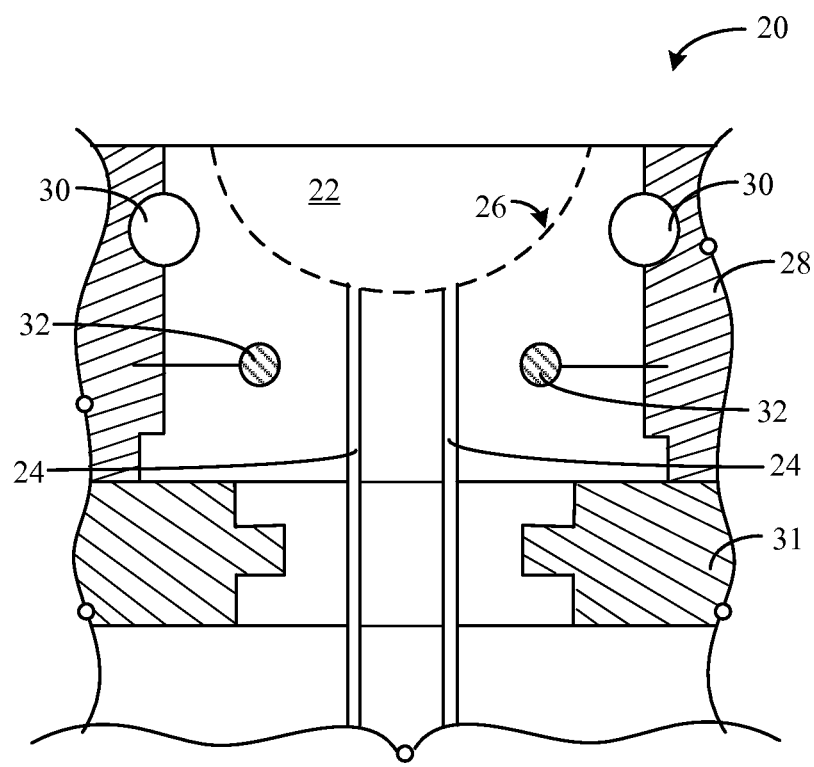
FIG. 2 is a cross-sectional view of a portion of an exemplary mold system.

The cover can be formed over the core (and any intermediate layers) by positioning the core (and any intermediate layers) within a pair of mold halves. FIG. 2 illustrates a mold system 20 that is capable of centrally retaining a core 16 within a spherical cavity 22 by a plurality of core pins 24. During a molding process, the heated polymer layer can be injected into the open volume defined between the mold insert surface 26 and the core 16. Each of the core pins 24 can retract during injection of the injection material, thereby allowing the injected material to flow completely around the core 16 and form a corresponding enclosed polymeric layer surrounding the core 16.

Unlike conventional systems, the mold system 20 illustrated in FIG. 2 is capable of performing post-injection molding curing and/or crosslinking processes within the same mold system. After the injected layer of the outer cover 12 has been cured and/or crosslinked, the core pins 24 can be extended to assist in ejecting the part from the mold system 20.

Mold system 20 comprises two mating mold halves. For convenience, only one mold half (lower cavity plate 28) is illustrated in the cross-sectional view of FIG. 2. In operation, however, a generally symmetrical upper cavity plate engages with lower cavity plate 28 to define one or more cavities 22. Mold system 20 can comprise a single cavity or a plurality of cavities to increase throughput. For example, the mold system can comprise 1 to 12 cavities or, in some cases more than 12 cavities. In addition, for convenience, the cavities herein are illustrated with smooth cavity surfaces; however, cavity surfaces can be provided with any desired texture or pattern, such as an inverse dimple pattern.

Upper and lower cavity plates can comprise one or more heat transfer channels 30. Heat transfer channels 30 can be configured to receive a cooling fluid to cool the upper and lower cavity plates as desired. As shown in FIG. 2, heat transfer channels 30 can extend through the mold halves (e.g., through upper and lower cavity plates) adjacent each cavity of the mold system. Heat transfer channels 30 can be configured to receive one or more cooling fluids, such as a cooling liquid or gas (e.g., air or, if pressurized, compressed air), that can serve to cool the material within the cavities (e.g., within the upper cavity plate and the lower cavity plate). The cooling fluid can be kept at a lower temperature than the mold is during processing, and thus can serve to cool the mold when the cooling fluid introduced into the cooling channels.

As shown in FIG. 2, heat transfer channels 30 can be situated so that they extend generally alongside portions of the cavities on both upper and lower cavity plates. Alternatively, or in addition, heat transfer channels 20 can extend below and/or above the cavities formed by the two mold halves. In some embodiments, heat transfer channels 30 can be used to receive a heated fluid to warm the mold during and/or prior to receiving the injection material. A vacuum plate 31 can be provided to remove trapped air from the mold cavity during the injection molding process.

The temperature of the material injected into the mold cavities can vary; however, in some embodiments, the temperature of injected material is less than about 70 degrees Celsius. Because the temperature required for curing and/or crosslinking is generally higher, and often significantly higher, mold system 20 is provided with one or more heating devices 32 that are capable of increasing the temperature of the injected molded part to the temperature required to achieve curing and/or crosslinking.

For example, in one embodiment, mold system 20 receives an injection material at a first temperature that is less than about 70 degrees Celsius. To achieve crosslinking, the injection material is then increased to a temperature of between about 70 and 300 degrees Celsius. In some embodiments, the preferred mold temperature for crosslinking can be between about 100 and 250 degrees Celsius, between about 130 and 230 degrees Celsius, or between about 150 and 210 degrees Celsius.

To increase mold temperatures to the desired temperature for crosslinking, heating devices 32 can be positioned adjacent respective mold cavities. For example, as shown in FIG. 2, heating devices 32 are positioned just below a portion of a mold cavity on a lower cavity plate. Although not shown in FIG. 2, it will be understood that additional heating devices 32 can be provided on the opposing mold half (e.g., just above a portion of a mold cavity on an upper cavity plate).

Heating devices 32 can comprise any heating system capable of increasing the temperature of the injected material to the temperature required for curing and/or crosslinking. The heating devices 32 illustrated in FIG. 2, for example, can comprise electric elements of one or more electric heaters.

In some embodiments, the temperature differential between the temperature of the injection material at the injection molding process and the temperature of the injected material during a curing and/or crosslinking process (as a result of the use of the heating devices) is greater than 50 degrees Celsius during a cycle (e.g., 50 degrees Celsius and 100 degrees Celsius). In some embodiments, the temperature differential during a cycle is greater than 100 degrees Celsius (e.g., 60 degrees Celsius and 160 degrees Celsius). In other embodiments, the temperature differential during a cycle is greater than 150 degrees Celsius (e.g., 50 degrees Celsius and 200 degrees Celsius). In other embodiments, the temperature differential during a cycle is greater than 200 degrees Celsius (e.g., 60 degrees Celsius and 260 degrees Celsius). In other embodiments, the temperature differential during a cycle is greater than 250 degrees Celsius (e.g., 50 degrees Celsius and 300 degrees Celsius). In other embodiments, the temperature differential during a cycle is greater than 300 degrees Celsius (e.g., 50 degrees Celsius and 350 degrees Celsius).

Figure 3:
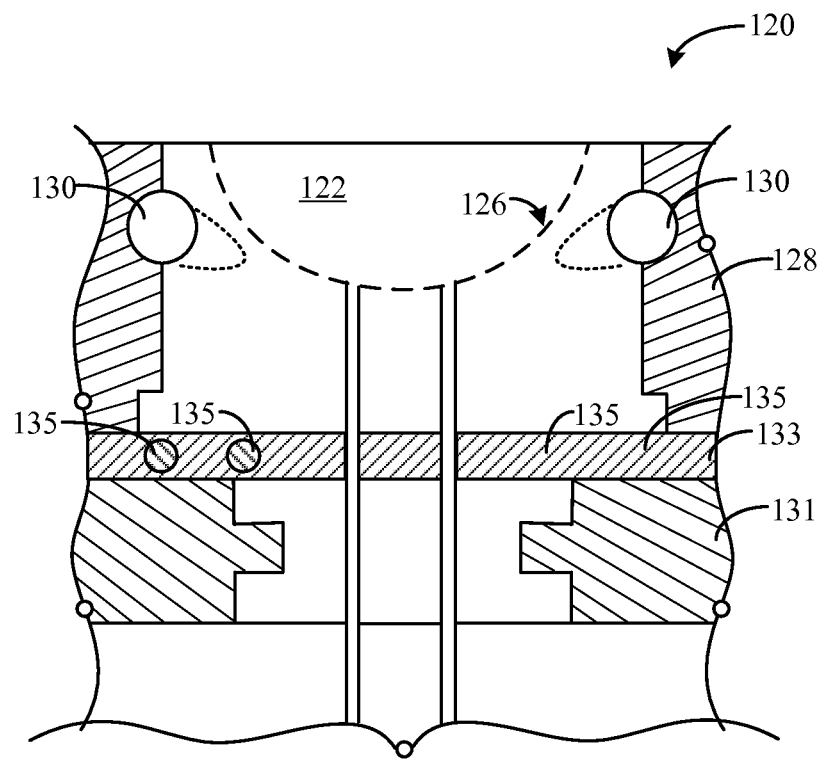
FIG. 3 is a cross-sectional view of a portion of another exemplary mold system.

FIG. 3 illustrates another embodiment of a mold system 120. For convenience, elements illustrated in FIG. 3 that are similar to those illustrated in FIG. 2 have similar reference numbers (e.g., "XX" and "1XX"). The heating devices of FIG. 3 differ from those illustrated in FIG. 2 by the inclusion of a heater block 133 with heating elements 135. The heating block is positioned below respective cavities of the mold system 120 in the lower cavity plate and, if desired, above respective cavity plates in the upper cavity plate. Thus, instead of just an electric element of a heater being positioned adjacent the cavities (e.g., FIG. 2), the heater device of FIG. 3 further includes a heater block 133.

Figure 4:
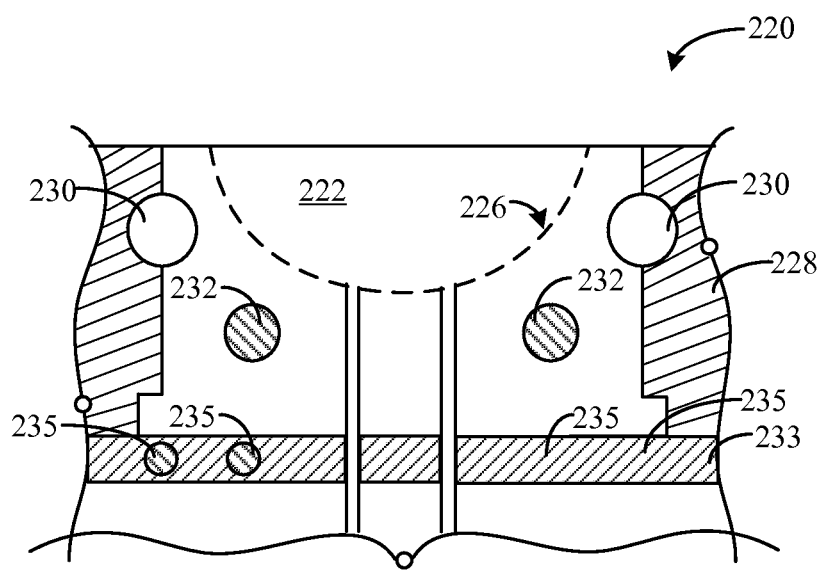
FIG. 4 is a cross-sectional view of a portion of another exemplary mold system.

FIG. 4 illustrates another embodiment of a mold system 220. Again, for convenience, elements illustrated in FIG. 4 that are similar to those illustrated in FIG. 3 have similar reference numbers (e.g., "XX", "1XX", and "2XX"). As shown in FIG. 4, mold system 220 comprises both heater devices 232 (as shown in FIG. 2) and a heater block 233 (as shown in FIG. 3).

The heating devices disclosed herein can be configured to rapidly heat the relevant portion of the mold system (i.e., the area adjacent respective cavities) to the desired curing and/or crosslinking temperature. In some embodiments, the temperature of the relevant portion of the mold system can reach the desired curing and/or crosslinking temperature in less than five minutes. In other embodiments, the temperature of the mold can reach the desired curing and/or crosslinking temperature in less than two minutes. In other embodiments, the temperature of the mold can reach the desired curing and/or crosslinking temperature in less than one minute. In other embodiments, the temperature of the mold can reach the desired curing and/or crosslinking temperature in less than thirty seconds.

After the temperature of the relevant portion of the mold system (i.e., the area adjacent respective cavities) reaches the desired curing and/or crosslinking temperature, the heating devices can maintain that temperature for between about thirty seconds and fifteen minutes, or, in some cases, between about five and ten minutes.

In some embodiments, the heating devices described herein can include one or more induction heating members. For example, instead of using electric heating elements, the heating devices disclosed herein can include one or more induction heating coils integrated into the mold (e.g., into the lower and/or upper cavity plate) and/or formed in a heater block, such as that depicted in FIG. 3. The induction heating coils can provide significantly quicker heating of the mold system than electric heating elements.

By using induction heating members as described above, mold temperatures can be controlled very precisely and can be rapidly changed from one temperature (e.g., an injection molding temperature) to another temperature (e.g., a curing or crosslinking temperature). Rapid progression from one temperature to another can reduce overall cycle times, thereby reducing the overall cost of operating the system. In addition, the use of induction heating members can reduce and/or eliminate the need to maintain and deliver high temperature liquids (e.g., thermal oil) or gasified media (e.g., steam), which can simplify the design of the system and also reduce certain dangers associated with maintaining and delivering high temperature media.

Accordingly, the mold systems described herein provide a means for receiving injection materials within one or more cavities and a means for heating the received injection materials to temperatures sufficient to achieve curing and/or crosslinking of the injected materials. Such systems improve quality control of the molded articles (e.g., golf balls) by reducing moving parts required in conventional systems which require transfer of the molded articles to other areas for the performance of curing and/or crosslinking techniques.

In certain embodiments, at least two layers of the golf ball construct may be simultaneously crosslinked. For example, a mantle layer and an outer cover layer may each respectively comprise crosslinkable resins that undergo simultaneous crosslinking upon heating as described above. In certain embodiments, the mantle layer may comprise a crosslinkable thermoplastic polyurethane, a crosslinkable polyamide, a crosslinkable ionomer, a crosslinkable polyalkenamer, or a mixture thereof. Preferably, the mantle layer comprises a crosslinkable ionomer or a crosslinkable polyalkenamer. In certain embodiments, the outer cover layer may comprise a crosslinkable thermoplastic polyurethane, a crosslinkable polyamide, a crosslinkable ionomer, or a mixture thereof.

Crosslinkable Materials

By utilizing the systems and methods disclosed herein, parts such as golf ball cover layers can be injection molded immediately followed by subsequent processing in the same mold system at higher temperatures and pressures to induce crosslinking and curing, resulting in thermoset properties in the final part. Such an initially injection moldable composition is thus called a post crosslinkable composition.

The apparatus and methods disclosed herein can be used with any crosslinkable resins for making golf balls. Illustrative crosslinkable resins include, for example, crosslinkable thermoplastic polyurethanes, crosslinkable polyamides, crosslinkable ionomers, and crosslinkable polyalkenamers.

If a post crosslinkable polyurea or polyurethane composition is used, a modified or blocked diisocyanate which subsequently unblocks and induces further cross linking post extrusion may be included in a diisocyanate starting material. Such a system is disclosed by Kim et al in U.S. Pat. No. 6,939,924, the entire contents of which are hereby incorporated by reference. Alternatively, a thermoplastic urethane or urea composition further comprising a peroxide or peroxide mixture can result in a thermoset. Such a system is disclosed by Kim in U.S. Pat. No. 6,924,337, the entire contents of which are hereby incorporated by reference. Thermoplastic urethane or urea compositions may further comprise a reaction product of a nitroso compound and a diisocyanate or a polyisocyanate to induce further cross linking post extrusion. Such a system is disclosed by Kim et al in U.S. Pat. No. 7,037,985 B2, the entire contents of which are hereby incorporated by reference.

Crosslinkable thermoplastic polyurethanes (TPU) are described, for example, in U.S. Pat. No. 6,924,337, and in U.S. Provisional Patent Application No. 61/746,539, filed Dec. 27, 2012, both of which are incorporated herein by reference in its entirety. A TPU may be mixed with a crosslinking agent such as a blocked/unblocked amine, a blocked/unblocked isocyanate, a hydroxyl-containing agent, a glycidyl-containing agent, a peroxide compound, and/or a sulfur compound, and then subjected to crosslinking conditions. In certain embodiments, a thermoplastic polyurethane having unsaturated carbon-carbon bonds is crosslinked by exposing the TPU to radiation and/or peroxides. In certain embodiments, a TPU may be hydroxy-terminated or -functionalized wherein the hydroxy groups are available for further reaction thereby enabling crosslinking. For example, in certain embodiments the crosslinkable polyurethane composition may comprise (i) a hydroxyl-functionalized crosslinkable thermoplastic polyurethane having a NCO:OH ratio of less than 1, more preferably less than 0.95, and most preferably less than 0.9, and (ii) at least one crosslinking agent. In further embodiments, the crosslinkable polyurethane composition may comprise (i) a hydroxy-functionalized crosslinkable thermoplastic polyurethane that includes at least one carbon-carbon unsaturated bond in the main chain or segment of the thermoplastic polyurethane and (ii) at least one crosslinking agent. Illustrative crosslinking agents include a diamine, a blocked amine, a diisocyanate, a blocked isocyanate, a polyamine, a polyisocyanate, a peroxide, a sulfur-containing compound, or a combination or mixture thereof.

Crosslinkable polyamides are described, for example, in U.S. Provisional Patent Application No. 61/746,540, filed Dec. 27, 2012, which is incorporated herein by reference in its entirety. For example, a crosslinkable polyamide composition may comprise 70 to about 99.5 wt % of one or more polyamides; and about 0.5 to about 30 wt % of one or more crosslinking agents, based on the total weight of the polyamide and the crosslinking agent. The resulting crosslinked polyamide may have a flexural modulus of about 5 to about 500 kpsi, and a material Shore D hardness of about 25 to about 85. The crosslinking agent may be a peroxide, a polyisocyanate, a blocked polyisocyanate, a diisocyanate, a blocked diisocyanate, a polyurethane prepolymer, a blocked polyurethane prepolymer, a polyurea prepolymer, a blocked polyurea prepolymer, a polyamine, a blocked polyamine, a diamine, a blocked diamine; a dicyanodiamide, a glycidyl group-containing polymer, and any and all combinations or mixtures thereof.

Crosslinkable polyamides may also be blend compositions that include a polyamide and zinc dioxide, or zinc diacrylate, or a peroxide.

Crosslinkable ionomers are described, for example, in U.S. Patent Publication No. 2011/0152010, which is incorporated herein by reference in its entirety. In certain embodiments, a crosslinkable ionomer may be a composition of (A) one or more ionomers; and (B) one or more crosslinking agents. In certain embodiments, a crosslinkable ionomer may be a composition of (A) an ionomer precursor composition including; i) one or more alpha olefin/unsaturated carboxylic acid polymers and/or alpha olefin/unsaturated carboxylic acid/carboxylic acid ester terpolymers, and ii) one or more basic metal or non-metal salts capable of neutralizing the acid groups in the acid polymer; and (B) one or more crosslinking agents. The crosslinking agent may be selected from the group consisting of polyisocyanate, blocked polyisocyanate, polyurethane prepolymer, blocked polyurethane prepolymer, polyurea prepolymer, blocked polyurea prepolymer, polyamine, blocked polyamine; dicyanodiamide, glycidyl group-containing polymers, zinc oxide, zinc diacrylate, a peroxide, and any and all combinations thereof.

Crosslinkable polyalkenamers are described, for example, in U.S. Patent Publication No. 2006/0166762 and U.S. Patent Publication No. 2010/0160079, both of which are incorporated herein by reference in their entireties. In certain embodiments, crosslinkable polyalkenamers are composition that include a polyalkenamer, preferably a polyoctenamer, and at least one crosslinking agent selected from zinc oxide, sulfur, an organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide. More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the disclosed compositions can be brought about by applying thermal energy, shear, irradiation, reaction with other chemicals, or any combination of these. Both homolytically and heterolytically decomposed peroxide can be used. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxy-isopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide.

In certain embodiments, the crosslinkable polyalkenamer composition may include a polyalkenamer; and an organic modifier that includes at least one carbon to carbon unsaturated bond and at least one functional group selected from carboxyl, hydroxyl, amino, epoxy, (meth)acrylate, vinyl, ester, isocyanate, carbonyl, urethane, anhydride, or a metal salt thereof.

Mold Systems with Reduced Runner Lengths

As discussed above, the systems and methods describe herein permit curing and/or crosslinking by heating the materials within the mold system after injection molding is performed. After curing and/or crosslinking molded parts, the excess material in the sprue and runners cannot generally be reused. That is, once cured and/or crosslinked excess materials or waste cannot be collected and recycled for use in other injection molding processes. Accordingly, mold systems with heating devices for curing and/or crosslinking as described herein can have reduced sprue and runner lengths that, in turn, reduce the generation of unrecyclable cured/crosslinked materials during mold cycles.

Figure 5:
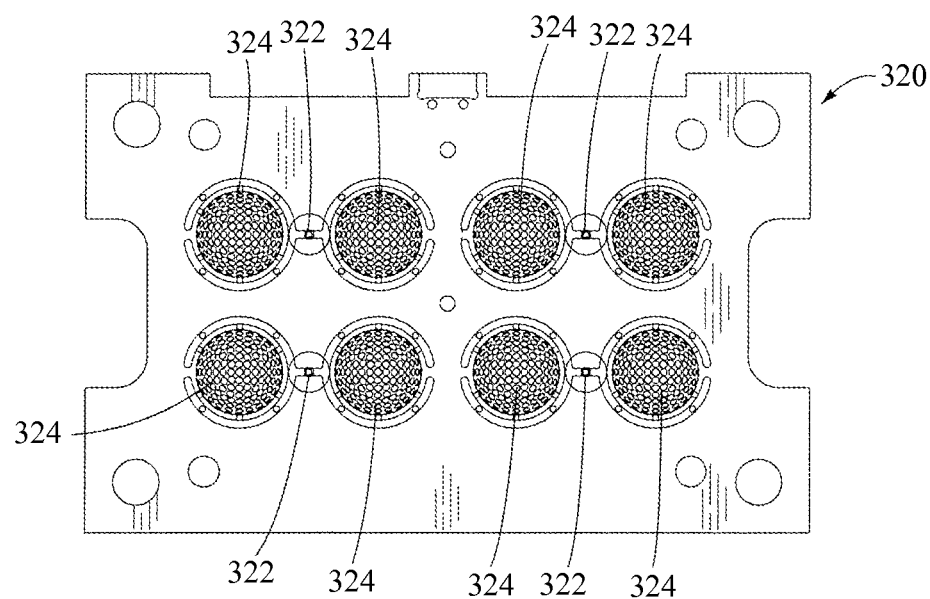
FIG. 5 is a top plan view of an exemplary cavity plate, illustrating a plurality of mold cavities.
Figure 6:
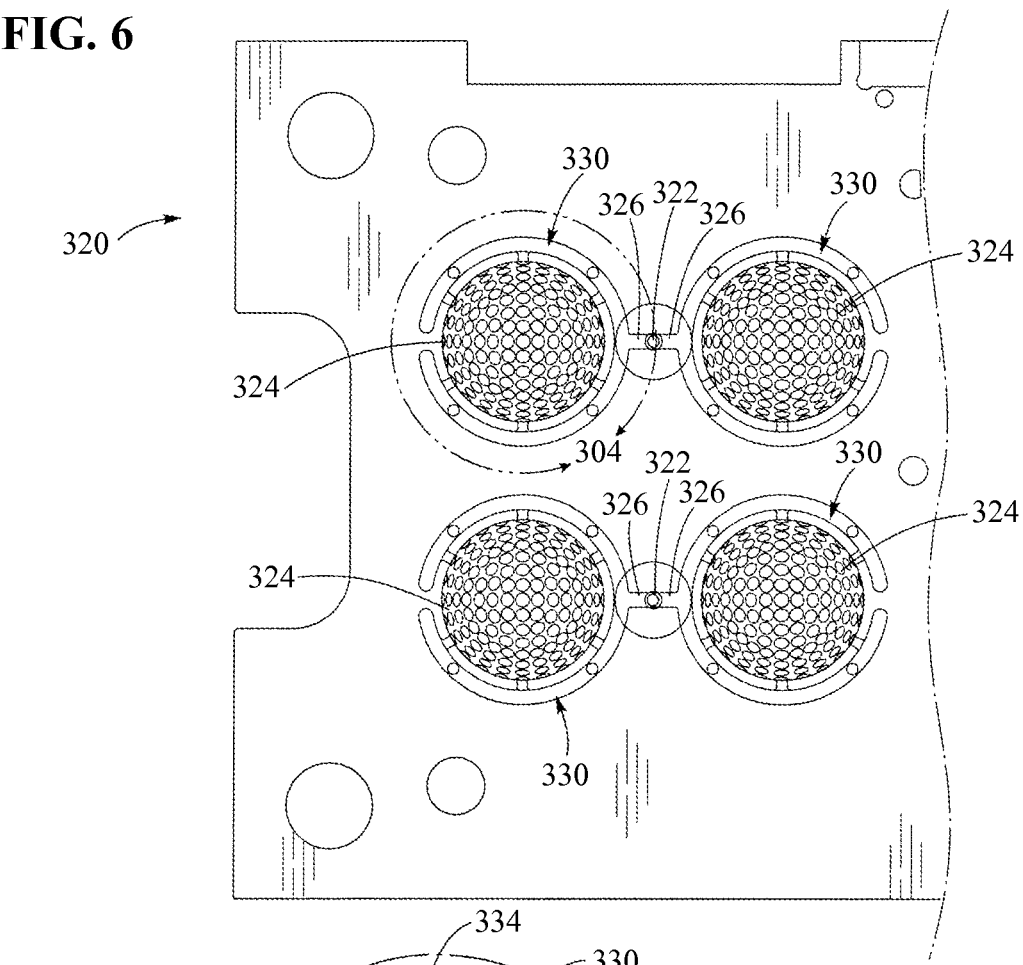
FIG. 6 is an enlarged view of a portion of the cavity plate shown in FIG. 2.
Figure 7:
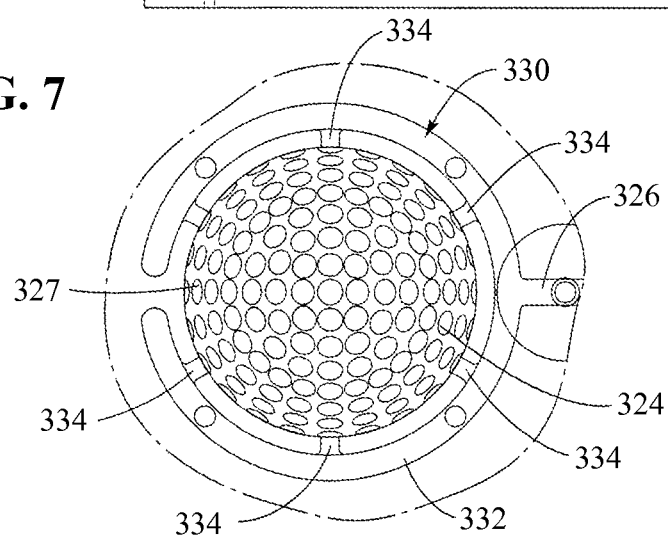
FIG. 7 is an enlarged view of a portion of FIG. 5, showing a valve gate and a runner adjacent a mold cavity.

FIGS. 5-7 illustrate exemplary mold systems that comprise the heating devices described herein (not shown in FIGS. 5-7), which are used in combination with the reduced length sprue and runner systems.

FIG. 5 illustrates a top view of a portion of a mold system 320 with valve gates 322 positioned adjacent one or more individual cavities 324 to reduce the length of travel for a viscous polymer (e.g., liquid or molten-state polymer) between respective valve gates 322 and cavities 324. The viscous polymer can be conveyed to the valve gate 322 of mold 320 using any suitable configuration, such as, for example, a hot runner, a hot sprue, or any other conventional runner system known in the art. By reducing the length of the flow from the introduction of the viscous polymer at a valve gate 322 to a cavity 324, the amount of excess material required for each mold cycle can be reduced, along with the additional cooling time associated with cooling that excess material.

FIG. 6 illustrates a close-up view of a portion of the mold 320 shown in FIG. 5. As shown in FIGS. 5 and 6, instead of traveling through conventional lengthy sprue and runner systems, the viscous polymer is delivered through valve gate 322 adjacent a mold cavity 324. Since valve gates 322 are adjacent mold cavities 324, the viscous polymer can be directed through a short runner 326 to mold cavity 324. From short runner 326, the viscous polymer can be delivered into mold cavity 324 in various manners. In the embodiment shown in FIG. 6, for example, the viscous polymer is delivered from short runner 326 to a radial runner and gate system 330 that substantially surrounds mold cavity 324. In some embodiments, the distance between the valve gate and the intersection of the short runner with the radial runner is less than 0.5 inches.

Radial runner and gate system 330 can comprise one or more radial runners 332 that generally surround the cavity 324 and one or more associated radial gates 334 that are approximately evenly spaced about the circumference 327 of the cavity 324. As discussed in more detail below, such an arrangement of runners, gates and cavities can provide a balanced (e.g., substantially symmetric) flow field of injection material and provide thin, injected-molded layers for golf balls.

FIG. 5 illustrates a plurality of valve gates 322 and a plurality of cavities 324, with each mold gate being located between two adjacent cavities such that the total number of mold gates is half that of the total number of cavities. However, it should be understood that other configurations are possible without departing from the scope of the invention. For example, in some embodiments, a separate valve gate 322 can be associated with each mold cavity 324 so that the ratio of valve gates to mold cavities is 1:1. In such an embodiment, each separate valve gate would be associated with a different short runner 326 that directs viscous polymer from the valve gate to the mold cavity.

The short runner 326 and radial runner 332 can each have a substantially circular cross-section. As shown in FIG. 6, injection material (e.g., polymer, ionomer, polyalkenamer composition, post-curable resin or thermoset plastic) can flow from a hot runner system (or other conventional system) through valve gate 322 to a short runner 326 that is adjacent to cavity 324. From the short runner, the injection material can flow to one or more radial runner 332 that generally surround the cavity. As shown in FIGS. 5 and 6, radial runners 332 can be circumferentially positioned relative to and radially spaced from a portion of a corresponding cavity 324. Polymer flows into the radial runners 332 directly from short runner 326, which can be generally perpendicular to the radial runners 332. If desired, radial runner 332 can convey polymer to one or more radial sub-runners. From the radial runner 332 (or radial sub-runners, if provided) injection material can be conveyed into a radial gate 334, opening to a corresponding mold cavity 324. In the embodiment shown in FIGS. 5-7, six radial gates 334 are spaced about a circumference of the cavity 324 and fed by one radial runner 332. It should be understood, however, that the number of radial gates and radial runners can vary.

Injection Materials

The following materials can be suitable for use for forming one or more layers of the golf balls disclosed herein. Polymeric materials generally considered useful for making golf balls according to the process of the present invention may also be included in the components of the golf balls of the present invention and these include, without limitation, synthetic and natural rubbers, thermoset polymers such as other thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

A most preferred polymeric material for golf balls is a polyurea or polyurethane, prepared by combining a diisocyanate with either a polyamine or polyol respectively, and one or more chain extenders (in the case of a thermoplastic polyurea or polyurethane) or curing agents (in the case of a thermoset polyurea or polyurethane) The final composition may advantageously be employed as an intermediate layer in a golf ball and even more advantageously as an outer cover layer.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 50 carbon atoms. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane- 1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates. These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Any polyol available to one of ordinary skill in the polyurethane art is suitable for use according to the invention. Polyols suitable for use in the reduced-yellowing compositions of the present invention include, but are not limited to, polyester polyols, polyether polyols, polycarbonate polyols and polydiene polyols such as polybutadiene polyols.

Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. The polyether polyol may be used either alone or in a combination.

Polycarbonate polyol is obtained by the condensation of a known polyol (polyhydric alcohol) with phosgene, chloroformic acid ester, dialkyl carbonate or diallyl carbonate. Particularly preferred polycarbonate polyol contains a polyol component using 1,6-hexanediol, 1,4-butanediol, 1,3-butanediol, neopentylglycol or 1,5-pentanediol. Polycarbonate polyols can be used either alone or in a combination with other polyols.

Polydiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Polybutadiene polyol includes liquid diene polymer containing hydroxyl groups having an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant.

Any polyamine available to one of ordinary skill in the polyurethane art is suitable for use according to the invention. The amine-terminated compound is selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from the group consisting of polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

The previously described diisocyante and polyol or polyamine components may be previously combined to form a prepolymer prior to reaction with the chain extender or curing agent. Any such prepolymer combination is suitable for use in the present invention. Commercially available prepolymers include LFH580, LFH120, LFH710, LFH1570, LF930A, LF950A, LF601D, LF751D, LFG963A, LFG640D.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent and even more preferably from about 3 percent to about 9 percent free NCO on an equivalent weight basis.

In view of the aforementioned advantages of injection molding versus the more complex casting process, under some circumstances it is advantageous to have formulations which are able to cure as a thermoset but only within a specified temperature range which is above that of the typical injection molding process. This allows parts, such as golf ball cover layers, to be initially injection molded, followed by subsequent processing at higher temperatures and pressures to induce further crosslinking and curing, resulting in thermoset properties in the final part. Such an initially injection moldable composition is thus called a post curable urethane or urea composition. Post curable urethane and urea compositions are examples of post curable resins which work well with the disclosed process.

If a post curable polyurea or polyurethane composition is required, a modified or blocked diisocyanate which subsequently unblocks and induces further cross linking post extrusion may be included in the diisocyanate starting material. Such a system is disclosed by Kim et al in U.S. Pat. No. 6,939,924, the entire contents of which are hereby incorporated by reference. Alternatively, a thermoplastic urethane or urea composition further comprising a peroxide or peroxide mixture, can then under post curing to result in a thermoset. Such a system is disclosed by Kim in U.S. Pat. No. 6,924,337, the entire contents of which are hereby incorporated by reference. Finally the thermoplastic urethane or urea compositions may further comprise a reaction product of a nitroso compound and a diisocyanate or a polyisocyanate to induce further cross linking post extrusion may be included in the diisocyanate starting material, Such a system is disclosed by Kim et al in U.S. Pat. No. 7,037,985 B2, the entire contents of which are hereby incorporated by reference.

Because the polyureas or polyurethanes used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., TINUVIN® 770, 765, and 328, are added to these aromatic polymeric materials. In addition, non-aromatic components may be used to minimize this discoloration, one example of which is described in copending U.S. patent application Ser. No. 11/809,432, filed on May 31, 2007, the entire contents of which are hereby incorporated by reference.

The outer cover and/or one or intermediate layers of the golf ball may also comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer." The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8\alpha$, $\beta$ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a metal selected from the group consisting of lithium, sodium, potassium, magnesium, calcium, barium, lead, tin, zinc or aluminum, and combinations thereof.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having a weight average molecular weight, Mw, of about 80,000 to about 500,000 and comprising one or more ethylene/ $\alpha,\beta$-ethylenically unsaturated $C_{3-8}$ carboxylic acid copolymers and/or one or more ethylene, alkyl(meth) acrylate, (meth)acrylic acid terpolymers; said high molecular weight component being partially neutralized with metal ions selected from the group consisting of lithium, sodium, zinc, calcium, magnesium, and a mixture of any these; and b) a low molecular weight component having a weight average molecular weight, Mw, of from about 2,000 to about 30,000 and comprising one or more ethylene/$\alpha$, $\beta$-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication No. US 2003/ 0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, potassium, magnesium, calcium, barium, lead, tin, zinc or aluminum, and any and all mixtures thereof; and b) from about 5 to about 40 weight percent (based on the total weight of said modified ionomeric polymer) of one or more fatty acids or metal salts of said fatty acid, the metal selected from the group consisting of lithium, sodium, potassium, magnesium, calcium, barium, lead, tin, zinc or aluminum, and any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having a weight average molecular weight, Mw, of about 80,000 to about 500,000 and comprising one or more ethylene/ $\alpha,\beta$-ethylenically unsaturated $C_{3-8}$ carboxylic acid copolymers and/or one or more ethylene, alkyl(meth) acrylate, (meth)acrylic acid terpolymers; said high molecular weight component being partially neutralized with metal ions selected from the group consisting of lithium, sodium, potassium, magnesium, calcium, barium, lead, tin, zinc or aluminum, and any and all mixtures thereof; and b) a low molecular weight component having a weight average molecular weight, Mw, of from about 2,000 to about 30,000 and comprising one or more ethylene/$\alpha$, $\beta$-ethylenically unsaturated $C_{3-8}$ carboxylic acid copolymers and/or one or more ethylene, alkyl(meth)acrylate, (meth)acrylic acid terpolymers; said low molecular weight component being partially neutralized with metal ions selected from the group consisting of lithium, sodium, potassium, magnesium, calcium, barium, lead, tin, zinc or aluminum, and any and all mixtures thereof; and c) from about 5 to about 40 weight percent (based on the total weight of said modified ionomeric polymer) of one or more fatty acids or metal salts of said fatty acid, the metal selected from the group consisting of lithium, sodium, potassium, magnesium, calcium, barium, lead, tin, zinc or aluminum, and any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_xCOOH$, wherein the carbon atom count includes the carboxyl group (i.e. x=2-73). The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7COOH$) and lauric acid ($C_{12}$, i.e., $CH_3(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3(CH_2)_7CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion. An example of such a modified ionomer polymer is DUPONT® HPF-1000 available from E. I. DuPont de Nemours and Co. Inc.

A preferred ionomer composition may be prepared by blending one or more of the unimodal ionomers, bimodal ionomers, or modified unimodal or bimodal ionomeric polymers as described herein, and further blended with a zinc neutralized ionomer of a polymer of general formula E/X/Y where E is ethylene, X is a softening comonomer such as acrylate or methacrylate and is present in an amount of from 0 to about 50, preferably 0 to about 25, most preferably 0, and Y is acrylic or methacrylic acid and is present in an amount from about 5 wt. % to about 25, preferably from about 10 to about 25, and most preferably about 10 to about 20 wt % of the total composition.

The outer cover and/or one or intermediate layers of the golf ball may also comprise one or more polyamide resins. Illustrative polyamides for use in the golf balls disclosed include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals. The polyether block comprises different units such as units which derive from ethylene glycol, propylene glycol, or tetramethylene glycol.

One type of polyetherester elastomer is the family of Pebax, which are available from Elf-Atochem Company. Preferably, the choice can be made from among Pebax 2533, 3533, 4033, 1205, 7033 and 7233. Some examples of suitable polyamides for use include those commercially available under the trade names PEBAX, CRISTAMID and RILSAN marketed by Atofina Chemicals of Philadelphia, Pa., GRIVORY and GRILAMID marketed by EMS Chemie of Sumter, S.C., TROGAMID and VESTAMID available from Degussa, and ZYTEL marketed by E.I. DuPont de Nemours & Co., of Wilmington, Del.

The outer cover and/or one or intermediate layers of the golf ball may also comprise a blend of an ionomer and a block copolymer. Examples of such block copolymers include styrenic block copolymers including styrene-butadiene-styrene (SBS), styrene-ethylene-butylene-styrene, (SEBS) and styrene-ethylene/propylene-styrene (SEPS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product, and in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred functionalized styrenic block copolymer is SEPTON HG-252. Such blends are described in more detail in commonly-assigned U.S. Pat. No. 6,861,474 and U.S. Patent Publication No. 2003/0224871 both of which are incorporated herein by reference in their entireties.

More preferred blends of block copolymers include from about 85 to about 99 wt % (based on the combined weight of Components A and B) of a block copolymer; and (B) from about 1 to about 15 wt % (based on the combined weight of Components A and B) of one or more modifying agents selected from the group consisting of amino acids, aminotriazines, dicyandiamides and polyamines and any and all combinations thereof.

Another preferred material for the outer cover and/or one or intermediate layers of the golf ball is a composition prepared by blending together at least three materials, identified as Components A, B, and C, and melt-processing these components to form in-situ, a polymer blend composition incorporating a pseudo-crosslinked polymer network. Such blends are described in more detail in commonly-assigned U.S. Pat. No. 6,930,150, to Kim et al, the content of which is incorporated by reference herein in its entirety. Component A is a monomer, oligomer, prepolymer or polymer that incorporates at least five percent by weight of at least one type of an acidic functional group. Examples of such polymers suitable for use as include, but are not limited to, ethylene/(meth)acrylic acid copolymers and ethylene/(meth) acrylic acid/alkyl(meth)acrylate terpolymers, or ethylene and/or propylene maleic anhydride copolymers and terpolymers. Examples of such polymers which are commercially available include, but are not limited to, the ESCOR® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-acrylic acid copolymers Nucrel 599, 699, 0903, 0910, 925, 960, 2806, and 2906 ethylene-methacrylic acid copolymers. sold by DuPont Also included are the bimodal ethylene/carboxylic acid polymers as described in U.S. Pat. No. 6,562,906, the contents of which are incorporated herein by reference. These polymers comprise ethylene/α,β-ethylenically unsaturated $C_{3-8}$ carboxylic acid high copolymers, particularly ethylene(meth)acrylic acid copolymers and ethylene, alkyl(meth)acrylate, (meth)acrylic acid terpolymers, having molecular weights of about 80,000 to about 500,000 which are melt blended with ethylene/α,β-ethylenically unsaturated $C_{3-8}$ carboxylic acid copolymers, particularly ethylene/(meth)acrylic acid copolymers having molecular weights of about 2,000 to about 30,000.

Component B can be any monomer, oligomer, or polymer, preferably having a lower weight percentage of anionic functional groups than that present in Component A in the weight ranges discussed above, and most preferably free of such functional groups. Examples of materials for use as Component B include block copolymers such as styrenic block copolymers including styrene-butadiene-styrene (SBS), styrene-ethylene-butylene-styrene, (SEBS) and styrene-ethylene/propylene-styrene (SEPS). Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. Commercial examples SEPTON® marketed by Kuraray Company of Kurashiki, Japan; TOPRENE by Kumho Petrochemical Co., Ltd and KRATON® marketed by Kraton Polymers.

Component C is a base capable of neutralizing the acidic functional group of Component A and is a base having a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, or metal acetates.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

The outer cover and/or one or intermediate layers of the golf ball may also comprise one or more polyalkenamers which may be prepared by ring opening metathesis polymerization of one or more cycloalkenes in the presence of organometallic catalysts as described in U.S. Pat. Nos. 3,492,245 and 3,804,803, the entire contents of both of which are herein incorporated by reference. Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see Rubber Chem. & Tech., Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60%

(cis-content of 40%) with a melting point of approximately 30° C. Both of these polymers have a double bond at every eighth carbon atom in the ring.

The polyalkenamer rubbers exhibit excellent melt processability above their sharp melting temperatures and exhibit high miscibility with various rubber additives as a major component without deterioration of crystallinity which in turn facilitates injection molding. Thus, unlike synthetic rubbers typically used in golf ball preparation, polyalkenamer-based compounds can be prepared which, are injection moldable. The polyalkenamer rubbers may also be blended within other polymers and an especially preferred blend is that of a polyalkenamer and a polyamide. A more complete description of the polyalkenamer rubbers and blends with polyamides is disclosed in copending U.S. application Ser. No. 11/335,070, filed on Jan. 18, 2006, in the name of Hyun Kim et al., the entire contents of which are hereby incorporated by reference In view of the many possible embodiments to which the principles of the present disclosure can be applied, it should be recognized that the illustrated embodiments are only examples and should not be taken as limiting the scope of the following claims. We therefore claim all that comes within the scope and spirit of these claims.

We claim:

1. An injection and curing mold system for manufacturing golf balls, comprising:
    an injection mold device having at least one substantially spherical cavity region configured to receive a heated injection material at a first temperature and at least one heat transfer channel configured to receive a cooling liquid, the at least one heat transfer channel being positioned adjacent respective ones of the spherical cavity regions;
    a pre-injection heating device integrated with the injection mold device; and
    a post-injection curing device integrated with the injection mold device and having at least one heating device positioned adjacent respective ones of the spherical cavity regions, the heating device being configured to increase the temperature of the heated injection material more than 50 degrees Celsius above the first temperature.

2. The mold system of claim, wherein the heating device is configured to increase the temperature of the heated injection material more than 100 degrees Celsius above the first temperature.

3. The mold system of claim 1, wherein the first temperature is less than 70 degrees Celsius and the curing device is configured to increase the temperature of the heated injection material to a temperature between 100 and 250 degrees Celsius.

4. The mold system of claim 1, wherein the heating device is configured to rapidly increase a temperature of a surface of respective spherical cavity regions to a desired crosslinking temperature that is greater than 50 degrees Celsius above the first temperature, the rapid increase in temperature being achieved within one minute.

5. The mold system of claim 1, wherein the one or more heating devices comprise heating elements of electric heaters.

6. The mold system of claim 1, wherein the one or more heating devices comprise heating elements of induction heating members.

7. The mold system of claim 1, wherein the one or more heating devices comprise a plurality of heating elements positioned in at least one heater block located adjacent to respective spherical cavity regions.

8. The mold system of claim 1, further comprising:
    a first radial runner and gate system that at least partially surrounds a circumference of the respective spherical cavity regions; and
    a first short runner extending from a first valve gate to the first radial runner and gate system of respective spherical cavity regions, the first short runner having a length of less than 0.5 inches defined by a distance between the first valve gate and the first radial runner and gate system of respective cavity regions.

9. The mold system of claim 1, wherein each of the at least one curing devices are positioned below a lower one of the respective spherical cavity regions or above an upper one of the respective spherical cavity regions.

10. The mold system of claim 7, wherein the at least one heater block comprises a first heater block below a lower one of the respective spherical cavity regions and a second heater block above an upper one of the respective spherical cavity regions.

11. The mold system of claim 1, wherein the pre-injection heating device is configured to deliver a heated fluid to the at least one heat transfer channel.

* * * * *